(12) United States Patent
Watanabe

(10) Patent No.: US 6,853,737 B2
(45) Date of Patent: Feb. 8, 2005

(54) ELECTRONIC WATERMARK EMBEDDING DEVICE AND ELECTRONIC WATERMARK DETECTING DEVICE, AND ELECTRONIC WATERMARK EMBEDDING METHOD AND ELECTRONIC WATERMARK DETECTING METHOD IMPLEMENTED THEREIN

(75) Inventor: Junya Watanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 676 days.

(21) Appl. No.: 09/821,412

(22) Filed: Mar. 29, 2001

(65) Prior Publication Data

US 2001/0028728 A1 Oct. 11, 2001

(30) Foreign Application Priority Data

Mar. 29, 2000 (JP) ........................................ 2000/090448

(51) Int. Cl.[7] ................................................ G06K 9/00
(52) U.S. Cl. ...................................................... 382/100
(58) Field of Search ................................ 382/100, 232; 713/176, 179, 180, 181; 348/460; 380/201, 202, 205, 209, 216

(56) References Cited

U.S. PATENT DOCUMENTS

| 5,832,119 A | * | 11/1998 | Rhoads ........................ 382/232 |
| 5,835,639 A | * | 11/1998 | Honsinger et al. ........... 382/278 |
| 6,570,997 B2 | * | 5/2003 | Noguchi ....................... 382/100 |
| 6,671,386 B1 | * | 12/2003 | Shimizu et al. .............. 382/100 |
| 2003/0021444 A1 | * | 1/2003 | Echizen et al. .............. 382/100 |

FOREIGN PATENT DOCUMENTS

| EP | 0 902 591 A2 | 3/1999 | ............ H04N/7/26 |
| EP | 0 905 967 A1 | 3/1999 | ............ H04N/1/32 |
| EP | 0 967 803 A2 | 12/1999 | ............ H04N/7/24 |
| JP | 10-145757 | 5/1998 | ............ H04N/7/08 |
| JP | 10-155091 | 6/1998 | .......... H04N/1/409 |
| JP | 10-191330 | 7/1998 | .......... H04N/7/30 |
| JP | 11-346302 | 12/1999 | .......... H04N/1/387 |
| JP | 11-355547 | 12/1999 | .......... H04N/1/387 |
| WO | WO 99/60791 | 11/1999 | ............ H04N/7/26 |

OTHER PUBLICATIONS

"Rotation, Scale and Translation Invariant Digital Image Watermarking", Joseph J.K. O Ruanaidh, et al., IEEE (1997), pp. 536–539.

* cited by examiner

Primary Examiner—Andrew W. Johns
Assistant Examiner—Shervin Nakhjavan
(74) Attorney, Agent, or Firm—Scully, Scott, Murphy & Presser

(57) ABSTRACT

An image analyzing unit analyzes an input image, and determines an embedding intensity level for an electronic watermark to be embedded in units of a pixel of the input image. The image analyzing unit then outputs the embedding intensity information to an electronic watermark pattern embedding unit and a displacement information pattern embedding unit, respectively. The electronic watermark pattern embedding unit embeds in the input image an electronic watermark pattern read from an electronic watermark pattern storage unit. At this time, the electronic watermark pattern is embedded based on the embedding intensity information. The displacement information pattern embedding unit embeds a displacement information pattern read from a displacement information pattern storage unit in the processed image having the electronic watermark pattern embedded therein. At this time, the displacement information pattern is embedded based on the embedding intensity information.

10 Claims, 6 Drawing Sheets

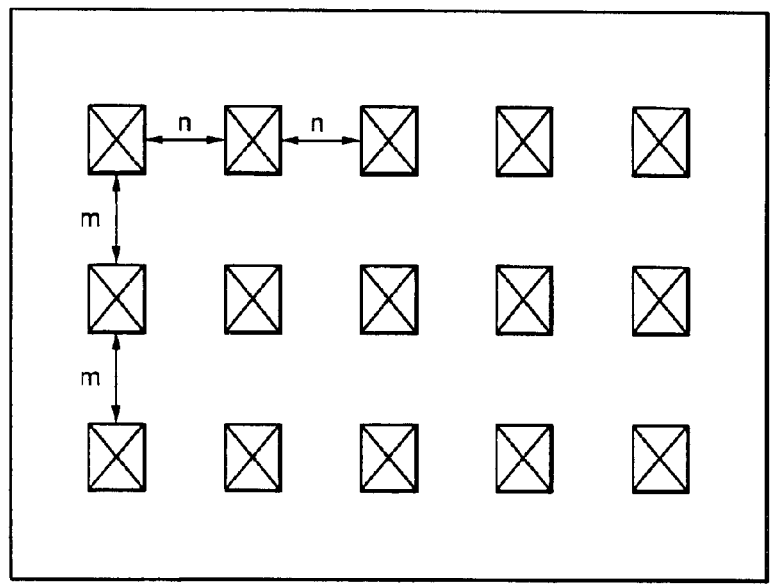
 POSITIONS AT WHICH DISPLACEMENT INFORMATION ITEMS ARE EMBEDDED
FIG. 2
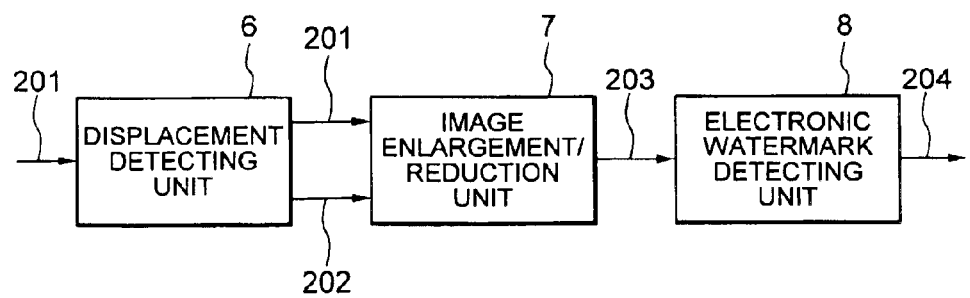
FIG. 3

ELECTRONIC WATERMARK EMBEDDING DEVICE AND ELECTRONIC WATERMARK DETECTING DEVICE, AND ELECTRONIC WATERMARK EMBEDDING METHOD AND ELECTRONIC WATERMARK DETECTING METHOD IMPLEMENTED THEREIN

BACKGROUND OF THE INVENTION

The present invention relates to an electronic watermark embedding device and an electronic watermark detecting device, and an electronic watermark embedding method and an electronic watermark detecting method implemented therein. More particularly, the present invention is concerned with a technology of embedding an electronic watermark in an enlarged or reduced image or video and a technology of detecting an embedded electronic watermark.

In recent years, electronic-media data including image or video data and multimedia data has spread rapidly along with an advance in technologies. For simplifying identification of a source of electronic-media data, an electronic watermark is often embedded in an image or video. Specifically, a provider of electronic-media data embeds the electronic watermark in electronic-media data to be provided. The provider can be specified with the electronic watermark. The embedded electronic watermark is detected using software or hardware, whereby the provider proves to own the copyright on the electronic-media data. Copyrights are thus managed and put into effect.

The foregoing electronic watermark embedding method or detecting method has been disclosed in, for example, Japanese Unexamined Patent Publication (JP-A) No. 10-145757 or JP-A No. 10-191330.

According to the foregoing electronic watermark embedding method, the electronic watermark is embedded in the image or video in units of a block. Therefore, after the electronic watermark is embedded, if the image or video is enlarged or reduced, the embedded electronic watermark may not be detected any longer.

Talking of an example of enlargement or reduction of the image or video, the image or video may be reduced and transmitted when, for example, a telecommunication line such as radio broadcasting permits only a low transmission rate. In this case, after the electronic watermark is embedded, the image or video is reduced. It is therefore hard to detect the electronic watermark in the image or video broadcast through radio broadcasting.

Moreover, if the image or video is enlarged or reduced by a so-called pirate, the electronic watermark cannot be detected. There is an increasing demand for an electronic watermark embedding device and an electronic watermark detecting device that can cope with enlargement or reduction.

SUMMARY OF THE INVENTION

Accordingly, an object of the present invention is to provide an electronic watermark embedding device and an electronic watermark detecting device capable of detecting an embedded electronic watermark even when an image or video is enlarged or reduced after the electronic watermark is embedded.

Another object of the present invention is to provide an electronic watermark embedding method and an electronic watermark detecting method that are implemented in the electronic watermark embedding device and electronic watermark detecting device, respectively.

An electronic watermark embedding device in accordance with the present invention includes an electronic watermark pattern embedding unit that embeds an electronic watermark pattern in input image or video data. According to an aspect of the present invention, the electronic watermark embedding device also includes a displacement information pattern embedding unit that embeds a displacement information pattern in the image or video having the electronic watermark pattern embedded therein, and transmits the resultant image or video. The displacement information pattern is produced in advance.

An electronic watermark detecting device in accordance with the present invention detects an electronic watermark pattern embedded in image or video data, According to an aspect of the present invention, the electronic watermark detecting device includes a calculation unit, an enlargement/reduction unit, and a detection unit. The calculation unit calculates a scale of enlargement or reduction for an image or video according to a displacement information pattern that is embedded in the image or video data together with the electronic watermark pattern. The enlargement/reduction unit enlarges or reduces the image or video on the scale of enlargement or reduction calculated by the calculation unit. The detection unit detects the electronic watermark pattern in the image or video enlarged or reduced by the enlargement/reduction unit.

An electronic watermark embedding method in accordance with the present invention is a method of embedding an electronic watermark pattern in Input image or video data. According to an aspect of the present invention, the electronic watermark embedding method includes a step of embedding a displacement information pattern in an image or video having the electronic watermark pattern embedded therein. The displacement information pattern is produced in advance.

An electronic watermark detecting method in accordance with the present invention is a method of detecting an electronic watermark pattern embedded in image or video data. According to an aspect of the present invention, the electronic watermark detecting method includes a calculation step, an enlargement/reduction step, and a detection step. At the calculation step, a scale of enlargement or reduction for an image or video is calculated based on the displacement information pattern that is embedded in the image or video data together with the electronic watermark pattern. At the enlargement/reduction step, the image or video is enlarged or reduced on the calculated scale of enlargement or reduction. At the detection step, the electronic watermark pattern is detected in the enlarged or reduced image or video.

The electronic watermark embedding device in accordance with the present invention embeds the displacement information pattern in the image or video having the electronic watermark pattern embedded therein, and transmits the resultant image or video. The displacement information pattern has displacement information items arranged with a predetermined distance between adjoining information items, and resists enlargement or reduction.

The electronic watermark detecting device in accordance with the present invention judges the scale of enlargement or reduction on which the image or video is enlarged or reduced after having the electronic watermark embedded therein. At this time, the scale of enlargement or reduction is judged from the displacement information pattern that is embedded together with the electronic watermark pattern. The electronic watermark detecting device then enlarges or reduces the image or video according to the result of judgment, and detects the electronic watermark pattern in the enlarged or reduced image or video.

Based on the scale of enlargement or reduction judged from the displacement information pattern, the raw or original image or video is converted into an image or video in which the electronic watermark can be detected. Consequently, after the electronic watermark is embedded, if the image or video is enlarged or reduced, the electronic watermark can be detected.

BRIEF DESCRIPTION OF THE DRAWINGS

FIG. 2 shows an example of a displacement information pattern employed in the present invention;

FIG. 3 is a block diagram showing the configuration of an electronic watermark detecting device in accordance with the embodiment of the present invention;

DESCRIPTION OF THE PREFERRED EMBODIMENTS

Figure 1:
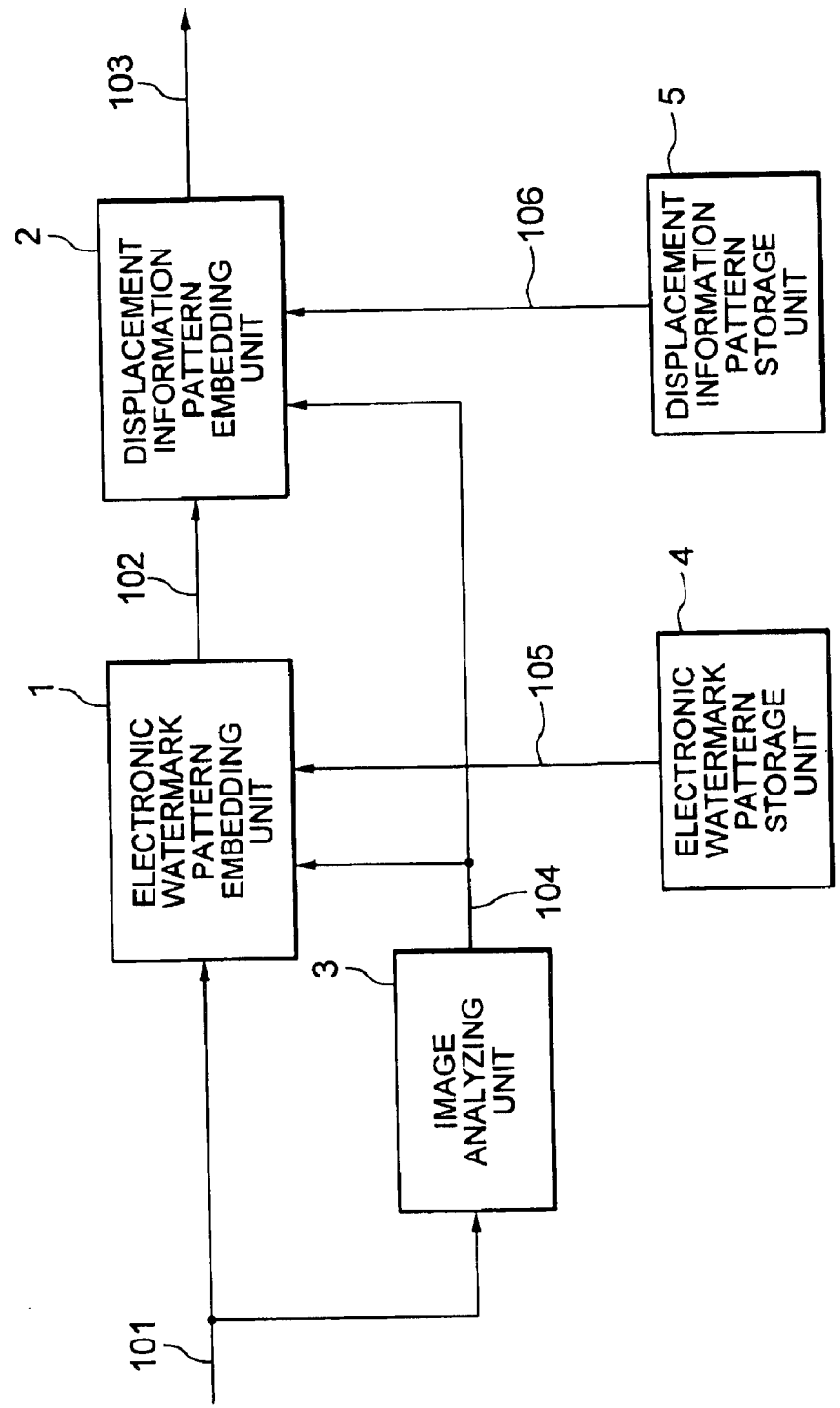
FIG. 1 is a block diagram showing the configuration of an electronic watermark embedding device in accordance with an embodiment of the present invention.

Referring to FIG. 1, a description will be made of an electronic watermark embedding device in accordance with an embodiment of the present invention. As shown in FIG. 1, the electronic watermark embedding device in accordance with the embodiment of the present invention consists mainly of an electronic watermark pattern embedding unit 1, a displacement information pattern embedding unit 2, an image analyzing unit 3, an electronic watermark pattern storage unit 4, and a displacement information pattern storage unit 5. A plurality of electronic watermark patterns are stored in the electronic watermark pattern storage unit 4, and a plurality of displacement information patterns are stored in the displacement information pattern storage unit 5.

Image or video data encoded according to any coding system recommended by the Moving Picture Experts Group is input to the electronic watermark embedding device. A description will be made on the assumption that an image is input. The same applies to input of a video.

The image analyzing unit 3 analyzes an input image 101, and determines an embedding intensity level for an electronic watermark to be embedded in units of a pixel of the input image 101. The image analyzing unit 3 outputs determined embedding intensity information 104 to the electronic watermark pattern embedding unit 1 and displacement information pattern embedding unit 2, respectively.

The electronic watermark pattern embedding unit 1 embeds an electronic watermark pattern 105 in the input image 101 according to the embedding intensity information 104 sent from the image analyzing unit 3. The electronic watermark pattern 105 is stored in the electronic watermark pattern storage unit 4. The electronic watermark pattern embedding unit 1 outputs a processed image 102 to the displacement information pattern shedding unit 2. The processed image 102 has the electronic watermark pattern embedded therein.

The displacement information pattern embedding unit 2 embeds a displacement information pattern 106 in the processed image 102 according to the embedding intensity information 104 sent from the image analyzing unit 3. The displacement information pattern 106 is stored in the displacement information pattern storage unit 5. The displacement information pattern embedding unit 2 outputs a processed image 103 to outside. The processed image 103 has the displacement information pattern embedded therein.

FIG. 2 shows an example of a displacement information pattern employed in the present invention. Referring to FIG. 2, a displacement information pattern has a plurality of displacement information items arranged with a predetermined distance between adjoining information items. For example, displacement information items have a size of 8 pixels by 8 pixels and resist enlargement or reduction. The displacement information items are arranged equidistantly. Herein, a distance between lengthwise adjoining information systems is equivalent to m pixels, and a distance between sideways adjoining information items is equivalent to n pixels.

Referring to FIG. 3, a description will be made of the electronic watermark detecting device in accordance with the embodiment of the present invention. As shown in FIG. 3, the electronic watermark detecting device in accordance with the embodiment of the present invention consists mainly of a displacement detecting unit 6, an image enlargement/reduction unit 7, and an electronic watermark detecting unit 8.

The displacement detecting unit 6 calculates a scale of enlargement or reduction on which an input image 201 is enlarged or reduced after having an electronic watermark pattern embedded therein. At this time, the scale of enlargement or reduction is calculated based on a displacement information pattern embedded in the input image 201. The displacement detecting unit 6 outputs the calculated scale of enlargement or reduction 202 and the input image 201 to the image enlargement/reduction unit 7. In this case, the displacement detecting unit 6 passes the input image 201 as it is, and outputs the input image 201 to the image enlargement/reduction unit 7.

The image enlargement/reduction unit 7 enlarges or reduces the input image 201 on the scale of enlargement or reduction 202 sent from the displacement detecting unit 6. The image enlargement/reduction unit 7 outputs an enlarged or reduced image 203 to the electronic watermark detecting unit 8. At this time, based on the scale of enlargement or reduction calculated by the displacement detecting unit 6, the image enlargement/reduction unit 7 converts the resolution of the image enlarged or reduced after having the electronic watermark pattern embedded therein. Namely, the resolution of the image is converted into a resolution attained immediately after the image has an electronic watermark pattern embedded therein.

The electronic watermark detecting unit 8 detects the electronic watermark pattern in the enlarged or reduced image 203. The enlarged or reduced image 203 has the resolution thereof converted by the image enlargement/reduction unit 7 so as to exhibit a resolution attained immediately after the electronic watermark pattern is embedded, that is, a resolution permitting detection of the electronic watermark pattern. The electronic watermark detecting unit 8 outputs the result of detection 204 to outside.

Figure 4:
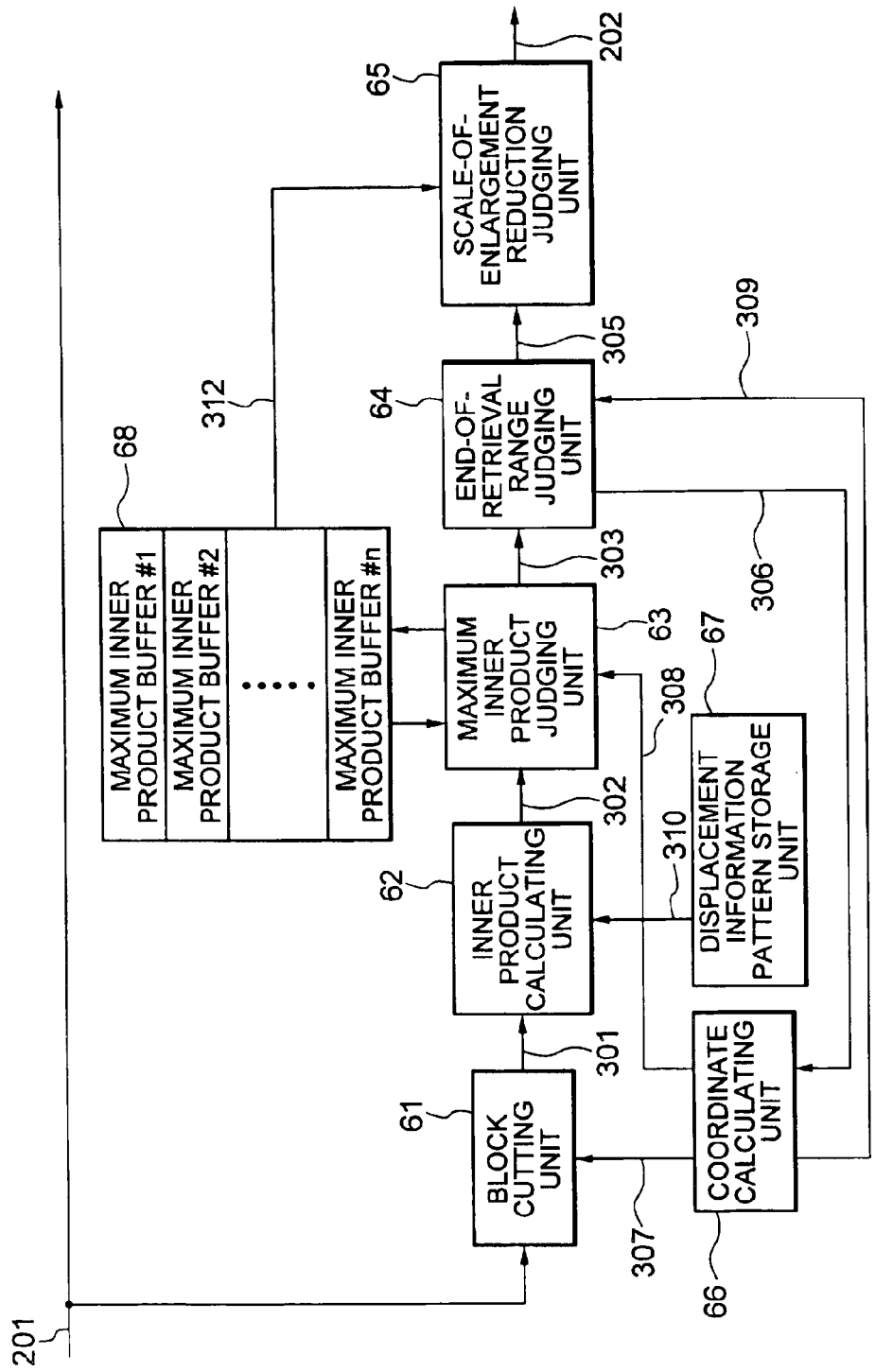
FIG. 4 is a block diagram showing the configuration of a displacement detecting unit shown in FIG. 3.

Referring to FIG. 4, a description will be made of the displacement detecting unit 6 shown in FIG. 3. As shown in FIG. 4, the displacement detecting unit 6 consists mainly of a block cutting unit 61, an inner product calculating unit 62, a maximum inner product judging unit 63, an end-of-retrieval range judging-unit 64, a scale-of-enlargement/ reduction judging unit 65, a coordinate calculating unit 66, a displacement information pattern storage unit 67, and a maximum inner product buffer unit 68.

The block cutting unit 61 cuts one block out of the input image 201 according to coordinates 306 sent from the coordinate calculating unit 66. The block cutting unit 61 outputs the one block 301 cut out to the inner product calculating unit 62, The inner product calculating unit 62 calculates an inner product of the one block 301 sent from the block cutting unit 61 and a displacement information pattern stored in the displacement information pattern storage unit 67. The inner product calculating unit 62 outputs the result of inner product calculation 302 to the maximum inner product judging unit 63.

The maximum inner product judging unit 63 compares the result of inner product calculation 302 sent from the inner product calculating unit 62 with information 311 read from the maximum inner product buffer unit 68. When the result of comparison reveals that the result of inner product calculation 302 is larger, the maximum inner product judging unit 63 outputs the result of inner product calculation 302 and coordinates 307 as the results of judgment 303 to the end-of-retrieval range judging unit 64. The coordinates 307 are coordinates indicating the position of the one block and calculated by the coordinate calculating unit 66. The maximum inner product judging unit 63 outputs the result of inner product calculation 302 as a result of inner product calculation 304. A value in an associated maximum inner product buffer included in the maximum inner product buffer unit 68 is replaced with the result of inner product calculation 304. The maximum inner product buffer unit 68 consists of maximum inner product buffers 1 to N (where N denotes a positive integer) associated with positions at which displacement information items are embedded (see FIG. 2).

In response to an end signal 309 received from the coordinate calculating unit 66, the end-of-retrieval range judging unit 64 outputs an end signal 305 to the scale-of-enlargement/reduction judging unit 65. The end signal 309 indicates the completion of cutting out a block of a predetermined range. If cutting out a block of the predetermined range is not completed, the end-of-retrieval range judging unit 64 outputs an instruction signal 306 to the coordinate calculating unit 66. The instruction signal 306 is used to instruct output of coordinates indicating the position of another block to be cut out.

In response to the end signal 305 received from the end-of-retrieval range judging unit 64, the scale-of-enlargement/reduction judging unit 65 reads information 312 from the maximum inner product buffer unit 68. Based on the information 312, the scale-of-enlargement/reduction judging unit 65 calculates a scale of enlargement or reduction in relation to coordinates read from the maximum inner product buffer unit 68. The scale-of-enlargement/reduction judging unit 65 then outputs the calculated scale of enlargement or reduction 202 to the sage enlargement/reduction unit 7.

The coordinate calculating unit 66 calculates coordinates 307 and 308 that indicate positions displaced in the +X and +Y directions and in the −X and −Y directions, respectively, from the position at which the displacement information pattern is embedded. The coordinate calculating unit 66 outputs the same numbers of pairs of coordinates 307 and 308 as the number of embedded displacement information items.

Figure 5:
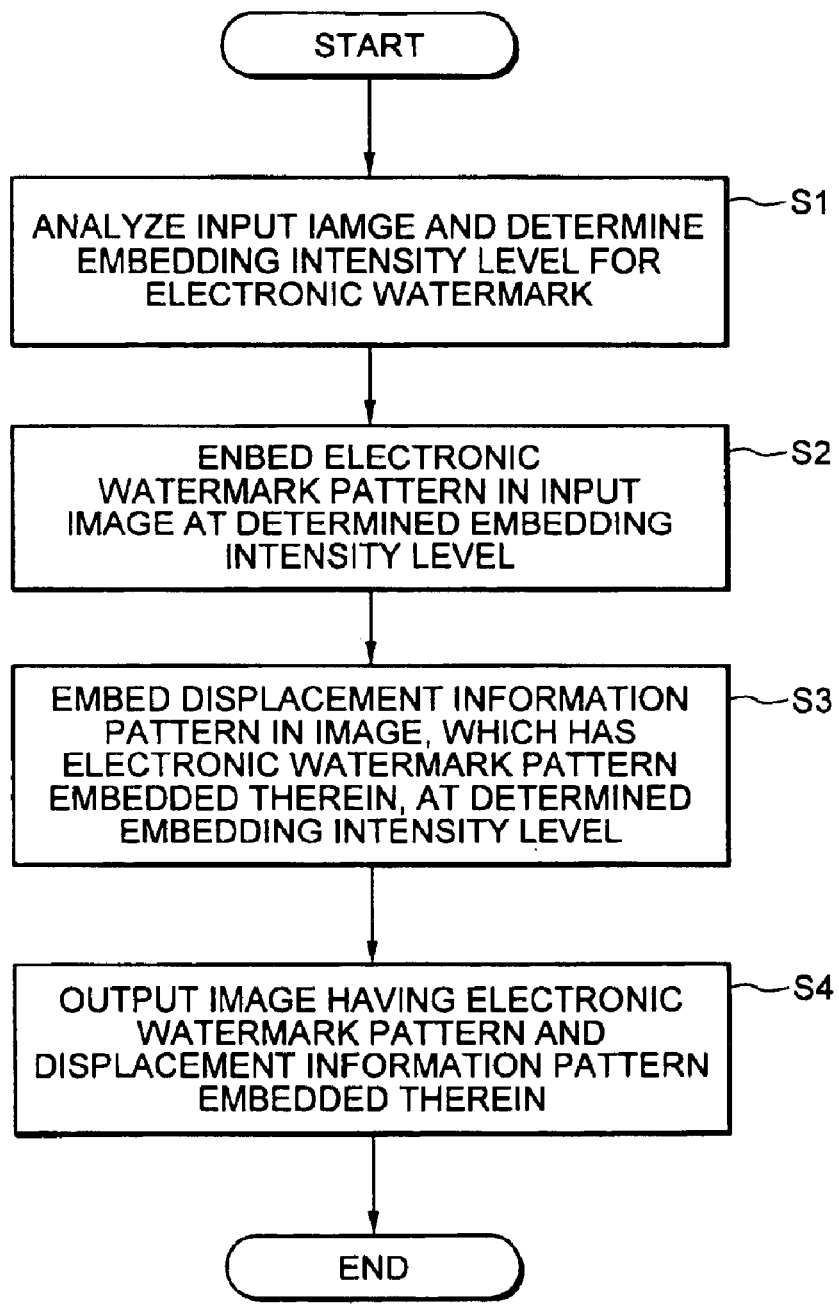
FIG. 5 is a flowchart describing actions of processing performed by the electronic watermark embedding device shown in FIG. 1.
Figure 6:
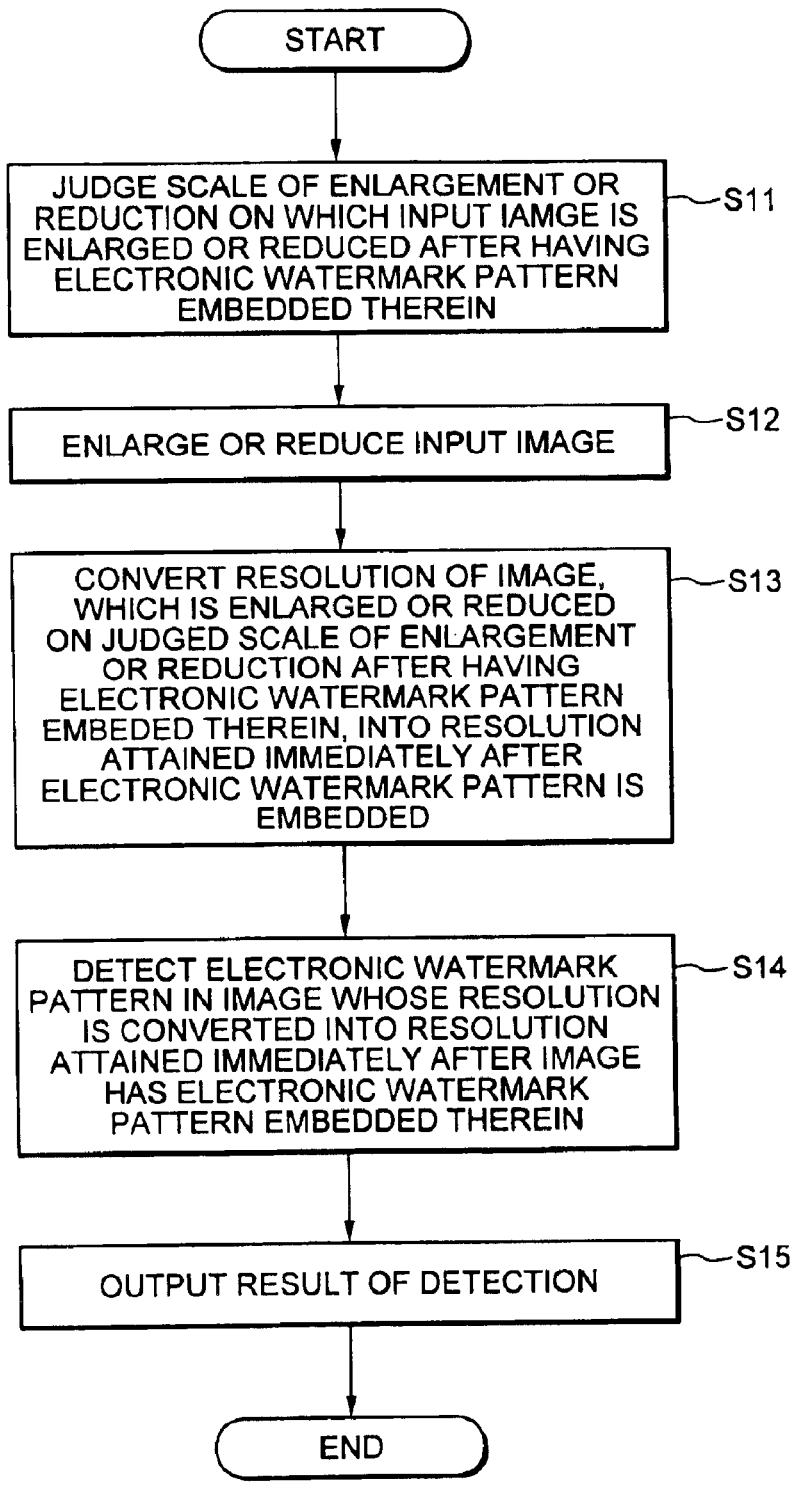
FIG. 6 is a flowchart describing actions of processing performed by the electronic watermark detecting device shown in FIG. 3.
Figure 7:
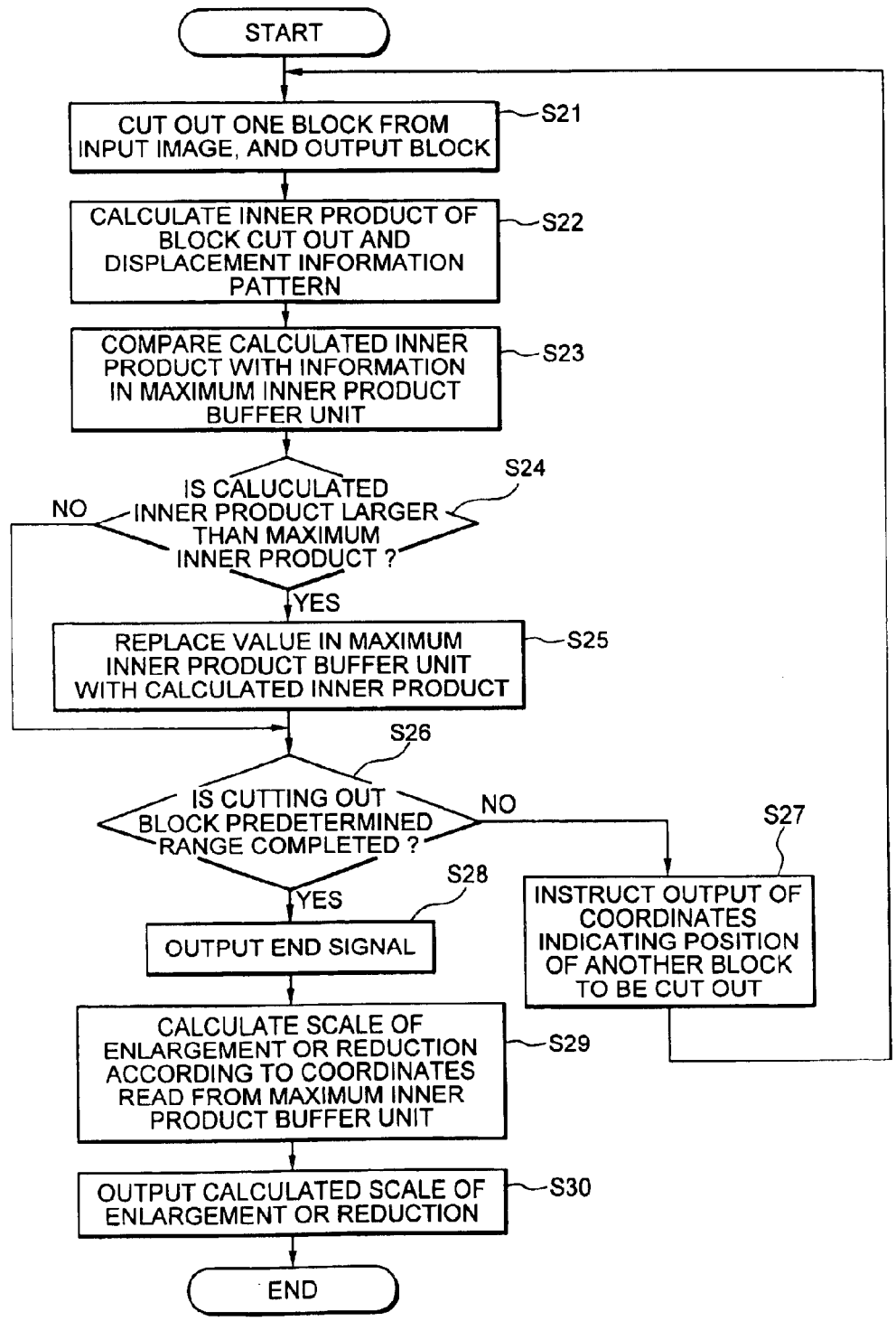
FIG. 7 is a flowchart describing actions of processing performed by the displacement detecting unit shown in FIG. 4.

FIG. 5 is a flowchart describing actions of processing performed by the electronic watermark embedding device shown in FIG. 1. FIG. 6 is a flowchart describing actions of processing performed by the electronic watermark detecting device shown in FIG. 3. FIG. 7 is a flowchart describing actions of processing performed by the displacement detecting unit 6 shown in FIG. 4.

Referring to FIGS. 1 to 7, a description will be made of an electronic watermark embedding method and an electronic watermark detecting method in accordance with the embodiment of the present invention.

At step S1 in FIG. 5, the image analyzing unit 3 analyzes the input image 101, and determines an embedding intensity level for the electronic watermark to be embedded in units of a pixel of the input image 101. The image analyzing unit 3 outputs the determined embedding intensity information 104 to the electronic watermark pattern embedding unit 1 and displacement information pattern embedding unit 2, respectively.

At step S2 in FIG. 5, the electronic watermark pattern embedding unit 1 embeds the electronic watermark pattern 105 in the input image 101 according to the embedding intensity information 104 sent from the image analyzing unit 3. The electronic watermark pattern 105 is stored in the electronic watermark pattern storage unit 4. The electronic watermark pattern embedding unit 1 outputs the processed image 102 having the electronic watermark pattern embedded therein to the displacement information pattern embedding unit 2.

At step S3 in FIG. 5, the displacement information pattern embedding unit 2 embeds the displacement information pattern 106 stored in the displacement information pattern storage unit 5 in the processed image 102 having the electronic watermark pattern embedded therein. At this time, the displacement information pattern 106 is embedded according to the embedding intensity information 104 sent from the image analyzing unit 3.

At step S4 in FIG. 5, the displacement information pattern embedding unit 2 outputs the processed image 103 having the displacement information pattern embedded therein to outside.

At step S11 in FIG. 6, the displacement detecting unit 6 calculates a scale of enlargement or reduction on which the input image 201 is enlarged or after having the electronic watermark pattern embedded therein. At this time, the scale of enlargement or reduction is calculated based on the displacement information pattern embedded in the input image 201. The displacement detecting unit 6 outputs the calculated scale of enlargement or reduction 202 and the input image 201 to the image enlargement/reduction unit 7. At this time, the displacement detecting unit 6 passes the input image 201 as it is and outputs the input image 201 to the image enlargement/reduction unit 7.

Step S11 is carried out according to a procedure described in FIG. 7. Specifically, at step S21 in FIG. 7, the block cutting unit 61 cuts out one block from the input image 201 according to coordinates 306 sent from the coordinate calculating unit 66. The block cutting unit 61 outputs the block 301 cut out to the inner product calculating unit 62.

At step S22 in FIG. 7, the inner product calculating unit 62 calculates an inner product of the block 301 cut out by the block cutting unit 61 and a displacement information pattern stored in the displacement information pattern storage unit 67. The inner product calculating unit 62 outputs the result of inner product calculation 302 to the maximum inner product judging unit 63.

At step S23 in FIG. 7, the maximum inner product judging unit 63 compares the result of inner product calculation 302 sent from the inner product calculating unit 62 with information 311 read from the maximum inner product buffer unit 68. At step S24 in FIG. 7, if the maximum inner product judging unit 63 judges that the result of inner product calculation 302 is larger, control is passed to step S25. If the result of inner product calculation 302 is smaller, control is passed to step S26. Moreover, if the result of inner product calculation 302 is larger, the maximum inner product judging unit 63 outputs the result of inner product calculation 302 and coordinates 307 that are calculated by the coordinate calculating unit 66 and indicate the position of the block cut out. At this time, the result of inner product calculation 302 and the coordinates 307 are output as the results of judgment 303 to the end-of-retrieval range judging unit 64.

At step S25, the maximum inner product judging unit 63 outputs the result of inner product calculation 302 as a result of inner product calculation 304. A value in an associated maximum inner product buffer included in the maximum inner product buffer unit 68 is replaced with the result of inner product calculation 304.

If the maximum inner product judging unit 63 judges at step S24 that the result of inner product calculation 302 is smaller, the maximum inner product judging unit 63 outputs the result of inner product calculation 302 and the coordinates 307 that are calculated by the coordinate calculating unit 66 and indicate the position of the block cut out. At this time, the result of inner product calculation 302 and the coordinates 307 are output as the results of judgment to the and-of-retrieval range judging unit 64.

At step S26 in FIG. 7, the end-of-retrieval range judging unit 64 judges whether cutting out a block of a predetermined range is completed. If cutting out a block of the predetermined range is not completed, the end-of-retrieval range judging unit 64 outputs an instruction signal 306 to the coordinate calculating unit 66 (step S27 in FIG. 7). The instruction signal 306 is used to instruct output of coordinates that indicate the position of another block to be cut out. On the other hand, in response to an end signal 309 received from the coordinate calculating unit 66, the end-of-retrieval range judging unit 64 outputs an end signal 305 to the scale-of-enlargement/reduction judging unit 65 (step S38 in FIG. 7). The end signal 309 indicates the completion of cutting out a block of the predetermined range.

At step S29 in FIG. 7, the scale-of-enlargement/reduction judging unit 65 receives the end signal 305 from the end-of-retrieval range judging unit 64. In response to the end signal 305, the scale-of-enlargement/reduction judging unit 65 reads information 312 from the maximum inner product buffer unit 68, and calculates a scale of enlargement or reduction according to coordinates read from the maximum inner product buffer unit 68. The scale-of-enlargement/reduction judging unit 65 outputs the calculated scale of enlargement or reduction 202 to the image enlargement/reduction unit 7 (step S30 in FIG. 7).

Referring back to FIG. 6, at step S12, the image enlargement/reduction unit 7 enlarges or reduces the input image 201 on the scale of enlargement or reduction 202 sent from the displacement detecting unit 6. The image enlargement/reduction unit 7 outputs the enlarged or reduced image 203 to the electronic watermark detecting unit 8. At this time, based on the scale of enlargement or reduction sent from the displacement detecting unit 6, the image enlargement/reduction unit 7 converts the resolution of the image enlarged or reduced after having the electronic watermark pattern embedded therein. Namely, the resolution of the image is converted into a resolution attained immediately after the image has the electronic watermark pattern embedded therein (step S13 in FIG. 6).

At step S14 in FIG. 6, the electronic watermark detecting unit 8 detects the electronic watermark pattern in the enlarged or reduced image 203. The enlarged or reduced image 203 has the resolution thereof converted by the image enlargement/reduction unit 7 so as to exhibit a resolution attained immediately after the image has the electronic watermark pattern embedded therein, that is, a resolution permitting detection of the electronic watermark pattern. The electronic watermark detecting unit 8 outputs the result of detection 204 to outside (step S15 in FIG. 6).

As mentioned above, the electronic watermark embedding device in accordance with the present invention embeds the electronic watermark pattern 105 in the input image (or video) 101. Thereafter, the displacement information pattern 106 is embedded in the image, and the resultant image is transmitted. The displacement information pattern 106 has displacement information items arranged with a predetermined distance between adjoining information items and resists enlargement or reduction. Consequently, the electronic watermark detecting device in accordance with the present invention can detect embedded electronic watermark data even in an image (or video) that is enlarged or reduced after having the electronic watermark embedded therein.

Moreover, the electronic watermark detecting device in accordance with the present invention judges a scale of enlargement or reduction on which an image (or video) is enlarged or reduced after having the electronic watermark embedded therein. At this time, the scale of enlargement or reduction is judged from a displacement information pattern embedded together with the electronic watermark pattern. Based on the result of judgment, the electronic watermark detecting device enlarges or reduces the image (or video), and detects the electronic watermark in the enlarged or reduced image (or video). Consequently, data of an embedded electronic watermark can be detected even in an image (or video) enlarged or reduced after having the electronic watermark embedded therein.

The aforesaid features are implemented by adding the aforesaid embedding units and detecting units to the second half parts of an electronic watermark embedding device and an electronic watermark detecting device which do not cope with enlargement or reduction. Consequently, an electronic watermark can be detected even in an enlarged or reduced image or video.

What is claimed is:

1. An electronic watermark embedding device including an electronic watermark pattern embedding unit that embeds an electronic watermark pattern in input image or video data, said electronic watermark embedding device further comprising:

displacement information pattern embedding means for embedding a displacement information pattern, which is produced in advance, in an image or video having the electronic watermark pattern embedded therein, and transmitting the resultant image or video;

said displacement information pattern embedding means including a displacement information pattern storage unit in which displacement information patterns are stored, and a displacement information pattern embedding unit for embedding the displacement information pattern, which is stored in the displacement information pattern storage unit, in the image or video having the electronic watermark pattern embedded therein, wherein the displacement information pattern has a plurality of displacement information items arranged with a predetermined distance between adjoining displacement information items, and the displacement information items resist enlargement or reduction.

2. An electronic watermark embedding device including an electronic watermark pattern embedding unit that embeds an electronic watermark pattern in input image or video data, said electronic watermark embedding device further comprising:

displacement information pattern embedding means for embedding a displacement information pattern, which is produced in advance, in an image or video having the electronic watermark pattern embedded therein, and transmitting the resultant image or video; and image analyzing means for analyzing the input image or video to determine an embedding intensity level of the electronic watermark pattern to be embedded, in units of a pixel of the image or video, wherein said electronic watermark pattern embedding unit and said displacement information pattern embedding means embed the electronic watermark pattern and the displacement information pattern, respectively, according to the embedding intensity level determined by said image analyzing means.

3. An electronic watermark embedding device including an electronic watermark pattern embedding unit that embeds an electronic watermark pattern in input image or video data, said electronic watermark embedding device further comprising:

displacement information pattern embedding means for embedding a displacement information pattern, which is produced in advance, in an image or video having the electronic watermark pattern embedded therein, and transmitting the resultant image or video; and image analyzing means for analyzing the input image or video to determine an embedding intensity level of the electronic watermark pattern to be embedded, in units of a pixel of the image or video, wherein said electronic watermark pattern embedding unit and said displacement information pattern embedding means embed the electronic watermark pattern and the displacement information pattern, respectively, according to the embedding intensity level determined by said image analyzing means;

said displacement information pattern embedding means including a displacement information pattern storage unit in which displacement information patterns are stored, and a displacement information pattern embedding unit for embedding the displacement information pattern, which is stored in the displacement information pattern storage unit, in the image or video having the electronic watermark pattern embedded therein.

4. An electronic watermark detecting device for detecting an electronic watermark pattern embedded in image or video data, said electronic watermark detecting device comprising:

calculating means for calculating a scale of enlargement or reduction, on which the image or video is enlarged or reduced, according to a displacement information pattern embedded in the image or video data together, with the electronic watermark pattern;

enlargement/reduction means for enlarging or reducing the image or video on the scale of enlargement or reduction calculated by said calculating means; and detecting means for detecting the electronic watermark pattern in the image or video enlarged or reduced by said enlargement/reduction means, wherein the displacement information pattern has a plurality of displacement information items arranged with a predetermined distance between adjoining displacement information items, and the displacement information items resist enlargement or reduction.

5. An electronic watermark detecting device according to claim 4, wherein said enlargement/reduction means converts the resolution of an image or video, which is enlarged or reduced after having the electronic watermark pattern embedded therein, into the resolution attained immediately after the image or video has the electronic watermark pattern embedded therein.

6. An electronic watermark detecting device for detecting an electronic watermark pattern embedded in image or video data, said electronic watermark detecting device comprising:

calculating means for calculating a scale of enlargement or reduction, on which the image or video is enlarged or reduced, according to a displacement information pattern embedded in the image or video data together with the electronic watermark pattern;

enlargement/reduction means for enlarging or reducing the image or video on the scale of enlargement or reduction calculated by said calculating means; and detecting means for detecting the electronic watermark pattern in the image or video enlarged or reduced by said enlargement/reduction means;

said calculating means including:

a coordinate calculating unit for outputting coordinate data based on which one block is cut out of the image or video, and outputting an end signal that indicates the completion of cutting out a block of a predetermined range;

a block cutting unit for cuffing out one block from the image or video according to the coordinate data;

a displacement information pattern storage unit in which displacement information patterns are stored;

an inner product calculating unit for calculating an inner product of the one block cut out and the displacement information pattern stored in said displacement information pattern storage device;

a maximum inner product buffer unit composed of a plurality of maximum inner product buffers associated with positions at which displacement information items are embedded;

a maximum inner product judging unit for comparing the result of inner product calculation with information read from said maximum inner product buffer unit, said maximum inner product judging unit receiving coordinate data from said coordinate calculating unit, said maximum inner product judging unit outputting the result of inner product calculation and the coordinates, which indicate the position of the one block cut out, as the results of judgment when the result of comparison reveals that the result of inner product calculation is larger, and said maximum inner product judging unit replacing a value in an associated maximum inner product buffer included in said maximum inner product buffer unit with the result of inner product calculation;

an end-of-retrieval range judging unit for outputting a signal, which indicates completion, in response to the end signal received from said coordinate calculating unit, and for, when cutting out a block of the predetermined range is not completed, outputting an instruction signal, which is used to instruct output of coordinates indicating the position of another block to be cut out, to said coordinate calculating unit; and a scale-of-enlargement/reduction judging unit for calculating a scale of enlargement or reduction according to information read from said maximum inner product buffer unit in response to the received signal that indicates completion.

7. An electronic watermark embedding method for embedding an electronic watermark pattern in input image or video data, said electronic watermark embedding method comprising the step of:

embedding a displacement information pattern, which is produced in advance, in the image or video having the electronic watermark pattern embedded therein, and transmitting the resultant image or video, wherein said displacement information pattern has a plurality of displacement information items arranged with a predetermined distance between adjoining displacement information items, and the displacement information items resist enlargement or reduction.

8. An electronic watermark embedding method for embedding an electronic watermark pattern in input image or video data, said electronic watermark embedding method comprising the step of:

embedding a displacement information pattern, which is produced in advance, in the image or video having the electronic watermark pattern embedded therein, and transmitting the resultant image or video; and analyzing the input image or video to determine an embedding intensity level of the electronic watermark pattern to be embedded, in units of a pixel of the image or video, wherein the electronic watermark pattern and the displacement information pattern are embedded based on the determined embedding intensity level.

9. An electronic watermark detecting method for detecting an electronic watermark pattern embedded in input or video data, said electronic watermark detecting method comprising the steps of:

calculating a scale of enlargement or reduction, on which the image or video is enlarged or reduced, according to a displacement information pattern embedded in the image or video data together with the electronic watermark pattern;

enlarging or reducing the image or video on the calculated scale of enlargement or reduction; and detecting the electronic watermark pattern in the enlarged or reduced image or video, wherein the displacement information pattern has a plurality of displacement information items arranged with a predetermined distance between adjoining displacement information items, and the displacement information items resist enlargement or reduction.

10. An electronic watermark detecting method according to claim 9, wherein said step of enlarging or reducing the image or video includes a step of converting the resolution of the image, which is enlarged or reduced after having the electronic watermark pattern embedded therein, into the resolution attained immediately after the image has the electronic watermark pattern embedded therein.

* * * * *